United States Patent [19]

Mielke et al.

[11] 4,215,350

[45] Jul. 29, 1980

[54] INK JET PRINTING APPARATUS WITH TWO DIFFERENT JET SPACINGS

[76] Inventors: Klaus H. Mielke; Ulf H. Mielke, both of 82, Rådavägen, S-435 00 Mölnlycke, Sweden

[21] Appl. No.: 31,517

[22] Filed: Apr. 19, 1979

[30] Foreign Application Priority Data

Apr. 19, 1978 [SE] Sweden ................................ 7804496

[51] Int. Cl.$^2$ ............................................ G01D 15/18

[52] U.S. Cl. .................................. 346/75; 346/140 R

[58] Field of Search .............. 346/75, 140 R; 400/126

[56] References Cited

U.S. PATENT DOCUMENTS

| | | | |
|---|---|---|---|
| 3,964,591 | 6/1976 | Hill et al. | 346/75 X |
| 4,050,077 | 9/1977 | Yamada et al. | 346/75 |
| 4,087,825 | 5/1978 | Chen et al. | 346/75 |
| 4,115,787 | 9/1978 | Fujimoto et al. | 400/126 X |
| 4,115,788 | 9/1978 | Takano et al. | 346/75 |

OTHER PUBLICATIONS

Pelkie, R. E. et al, Ink Jet Head, IBM Technical Disclosure Bulletin, Jul. 1977, vol. 20, No. 2, pp. 553-554.

*Primary Examiner*—George H. Miller, Jr.

[57] ABSTRACT

Apparatus for applying characters to packages or other objects advanced through a marking station. The characters, which each consist of a pattern of points or spots, are applied by the discharge of ink onto the object from a plurality of nozzles arranged in a row extending transversally of the direction of advancement of the object. Each of the nozzles is connected through a solenoid valve to a source of pressurized ink. The solenoid valves are controlled by a pattern generator which at predetermined intervals selects solenoid valves to be activated and causes a simultaneous opening pulse to be supplied to the solenoid valves selected. The height of the characters can be varied by means of switch means whereby one or the other of two groups of solenoid valves, corresponding to two groups of nozzles in said row, is rendered available for the selection. One of said groups of nozzles is composed of every second nozzle of the other row and additional nozzles arranged with a pitch equal to twice the pitch of the nozzles of the other row.

5 Claims, 6 Drawing Figures

INK JET PRINTING APPARATUS WITH TWO DIFFERENT JET SPACINGS

BACKGROUND OF THE INVENTION

The invention relates to ink jet printing apparatus as used for applying characters, for instance letters or figures, on packages or other objects to be marked, which are advanced along a path through or past a marking station by suitable advancing means. More particularly, the invention relates to an ink jet printing apparatus of the type comprising a plurality of ink jet nozzles, means for supporting said nozzles in a row in which the axes of the nozzles define a common plane, a solenoid valve (that is, an electromagnet operated valve) for controlling the supply of pressurized ink to each of said nozzles, a control circuit for each of said solenoid valves, and a pattern generator having a plurality of output leads connected to said control circuits, said pattern generator being arranged successively to select predetermined output leads or combinations of output leads and to cause an operating pulse to be transmitted through said selected output leads and control circuits to the respective solenoid valves controlled thereby.

The opening of the valve caused by said pulse results in the ejection of a small volume of ink which when hitting the surface to be marked forms a point or spot of ink on the same. When a combination of two or more output leads is selected, resulting in the operation of two or more valves at a time, the resulting two or more spots on the surface of the object form a row extending transversally of the direction of advancement of the object. The characters to be applied may consist of a single spot, or a single row of spots, or, more frequently, of several rows of spots forming one of a plurality of predetermined patterns determined by the programming of the pattern generator, the spacing between successive rows being also determined by the pattern generator.

It is a principal object of the invention to improve apparatus of the kind above set out by the provision of means for effecting a quick change-over between two (or more) character sizes, without any exchange or mechanical adjustment of the nozzles.

SUMMARY OF THE INVENTION

According to a principal feature of the invention, the object above indicated is achieved by providing the apparatus with electric switch means arranged in a first position to connect each of the output leads of the pattern generator to a respective one of the control circuits of a first group of said solenoid valves controlling the ink supply to a first group of nozzles in said row arranged at a uniform pitch, and in a second position to connect each of said output leads to a respective one of the control circuits of a second group of solenoid valves controlling the ink supply to a second group of nozzles in said row arranged at a pitch equal to twice the pitch of said first group of nozzles and including nozzles within said first group as well as nozzles outside of said first group.

Other objects, features and advantages of the invention will appear from the following description of a specific embodiment of the invention with reference to the accompanying drawings.

DRAWINGS

FIG. 1 is a somewhat schematical perspective view of a conveyor with a marking station equipped with one form of the apparatus according to the invention, FIG. 2 is a partially exploded perspective view on a greater scale than FIG. 1 showing certain parts of the apparatus of FIG. 1, FIGS. 3 and 4 show examples of different forms of the character "1" produced by means of the apparatus according to FIGS. 1 and 2, FIG. 5 is a circuit diagram of the electrical circuit system of the apparatus of FIGS. 1 and 2, FIG. 5*a* is an extension of FIG. 5 showing the solenoid valves of FIG. 5 and the respective ink jet nozzles connected to them.

DETAILED DESCRIPTION

Figure 1:
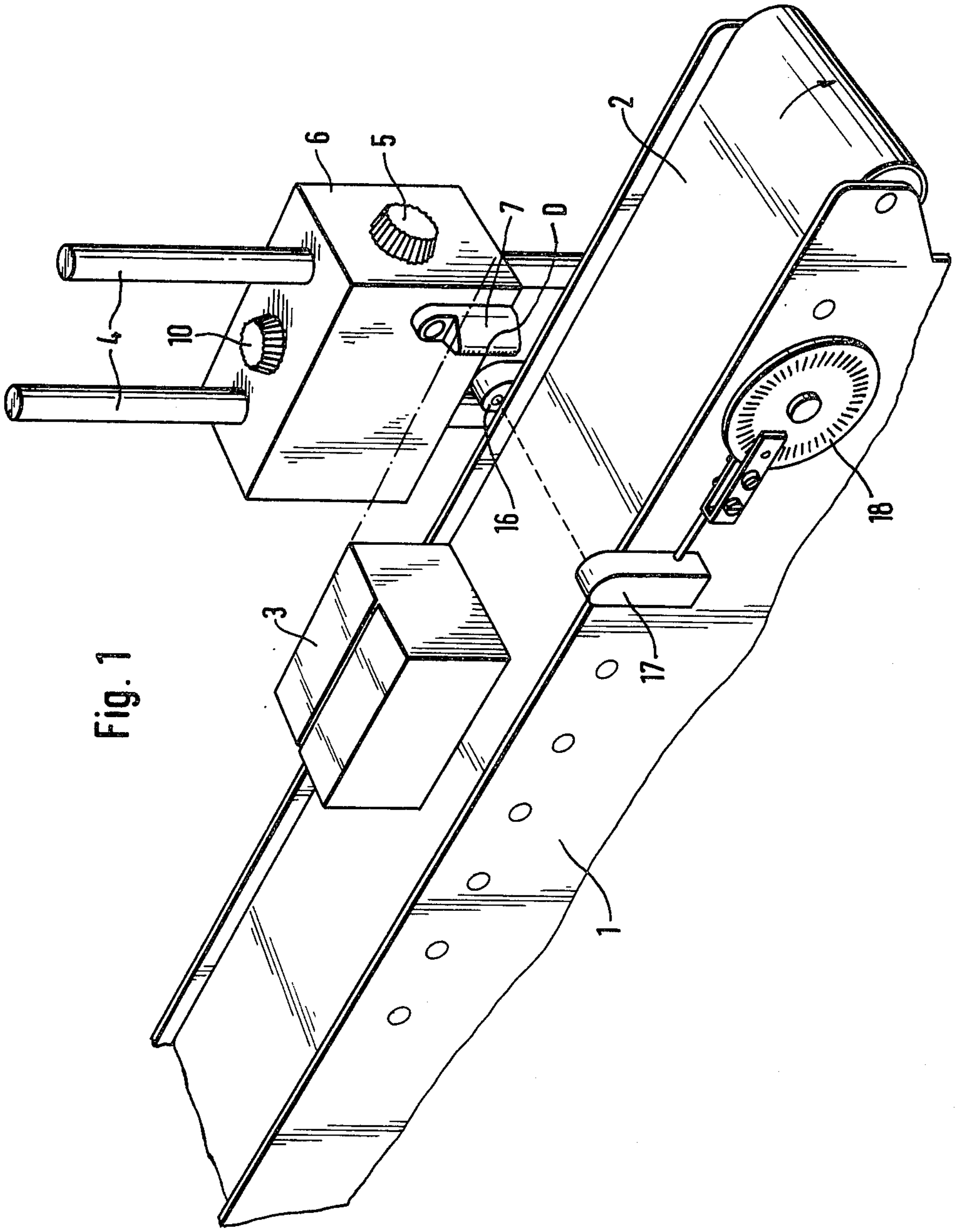

FIG. 1 shows a conveyor frame 1 with rollers supporting a continuously advanced conveyor belt 2 carrying a package 3 towards the marking station. At the marking station, a pair of uprights 4 attached to the conveyor frame support a housing 6 which is vertically slidable on said uprights and maintained in a desired vertical position by means of a clamping screw 5. A member 7 attached to the wall of said housing facing the conveyor constitutes a frame or holder for a row of thirteen ink jet nozzles D. In order to make the nozzles D visible in FIG. 2, the figure represents them shifted forward from their actual positions in which they are hidden by the hood-shaped front portion of the holder 7. Each of the nozzles is connected through a conduit 8 and a solenoid valve (electromagnet valve) S to an ink container 9 the charging aperture of which is available through a hole in the upper wall of the housing 6 and is normally closed by a cap 10. The ink or marking liquid is supplied to the magnet valves at a constant, comparatively low pressure above the atmospheric pressure, for instance 0.15 atmospheres. The pressure is provided by a built-in pump (not shown) inside the container 9. Each of the solenoid valves S is provided with an electric control lead forming part of a cable 11 connected to the electrical control unit (not shown in FIGS. 1–2) mounted on a separate rack.

The holder 7 is supported by an axle 12 rotatably mounted in the wall of the housing 6. A lever 13 rigidly connected to said axle is arranged to be operated by a pair of shift magnets 14, 15, by means of which the holder can be set either to the position represented in FIG. 1, in which the row of nozzles is at right angles to the direction of advancement of the conveyor, or to a slightly inclined position. The apparatus is, consequently, capable of producing inclined characters (FIG. 4) as well as upstanding characters (FIGS. 1–3).

Figure 2:
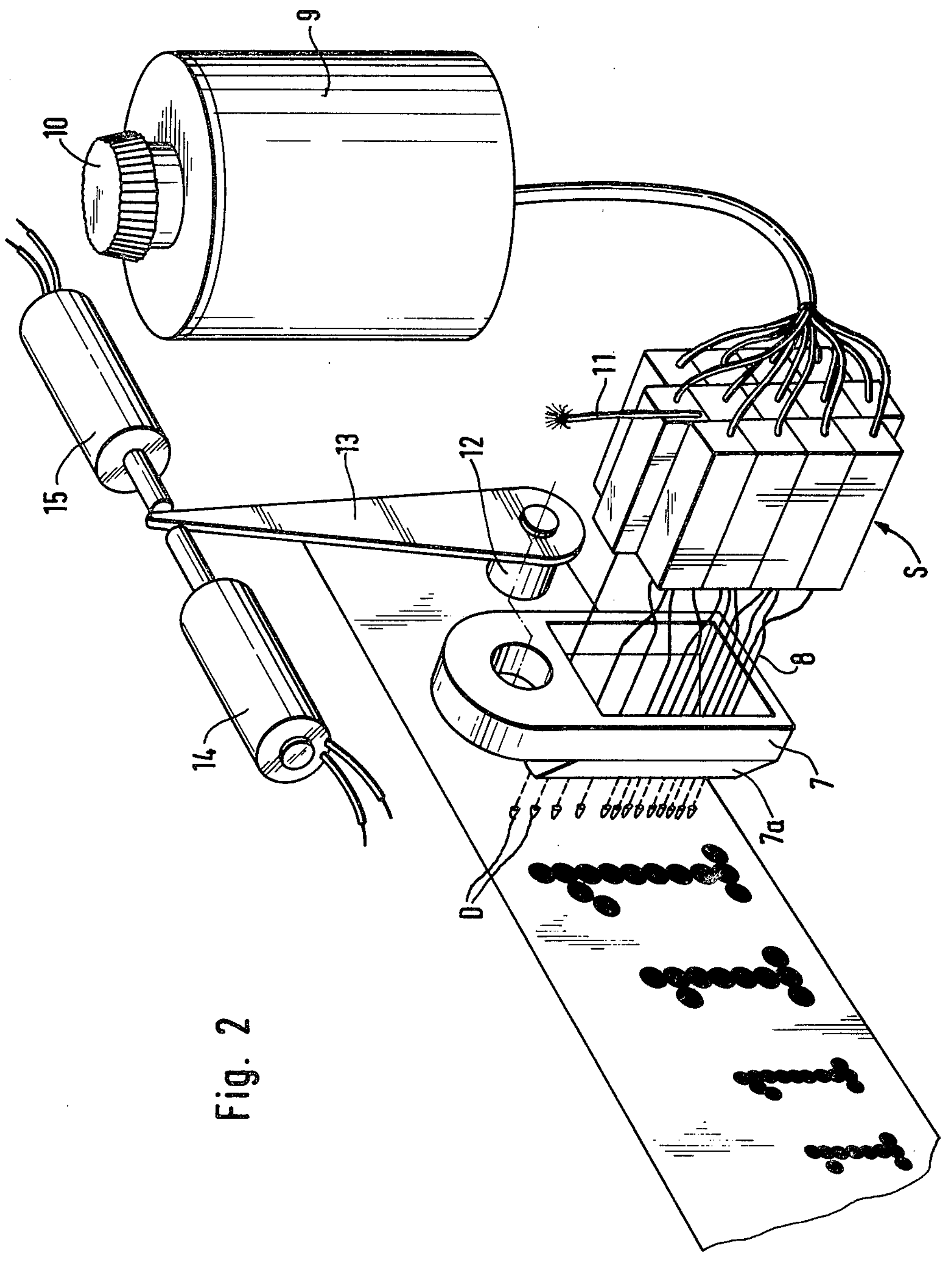
Figure 3:
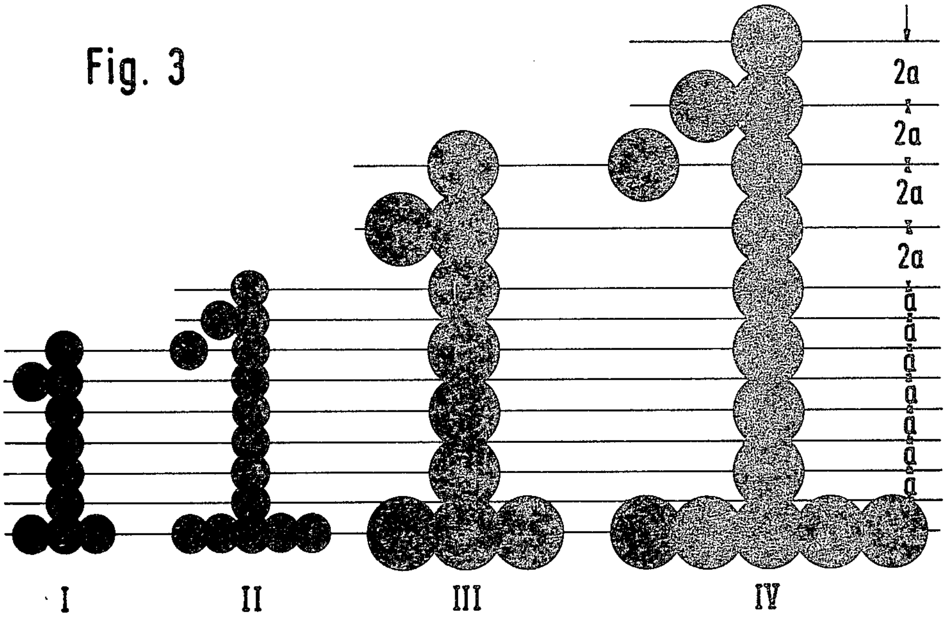

As seen from FIG. 2, the nozzles D form a lower group of nine regularly spaced nozzles and an upper group of four nozzles arranged at larger intervals than those of the lower group. More particularly, the pitch of the nozzles of the upper group and, consequently, the pitch of the vertical positions of the points or spots produced on the package by said nozzles, is equal to twice the pitch of the nozzles of the lower group or the pitch of the vertical positions of the corresponding points or spots. In FIGS. 3 and 5*a*, said pitches are denoted 2*a* and a, respectively.

The marking station also comprises a photocell device 16, 17 arranged to react to the arrival of a package to the marking station. A tachometer generator 18 mounted on the conveyor frame 1 generates a signal varying with the speed of the conveyor belt 2. Signal leads (not shown) connect the photocell device and the tachometer generator to the electric control unit.

Figure 5:
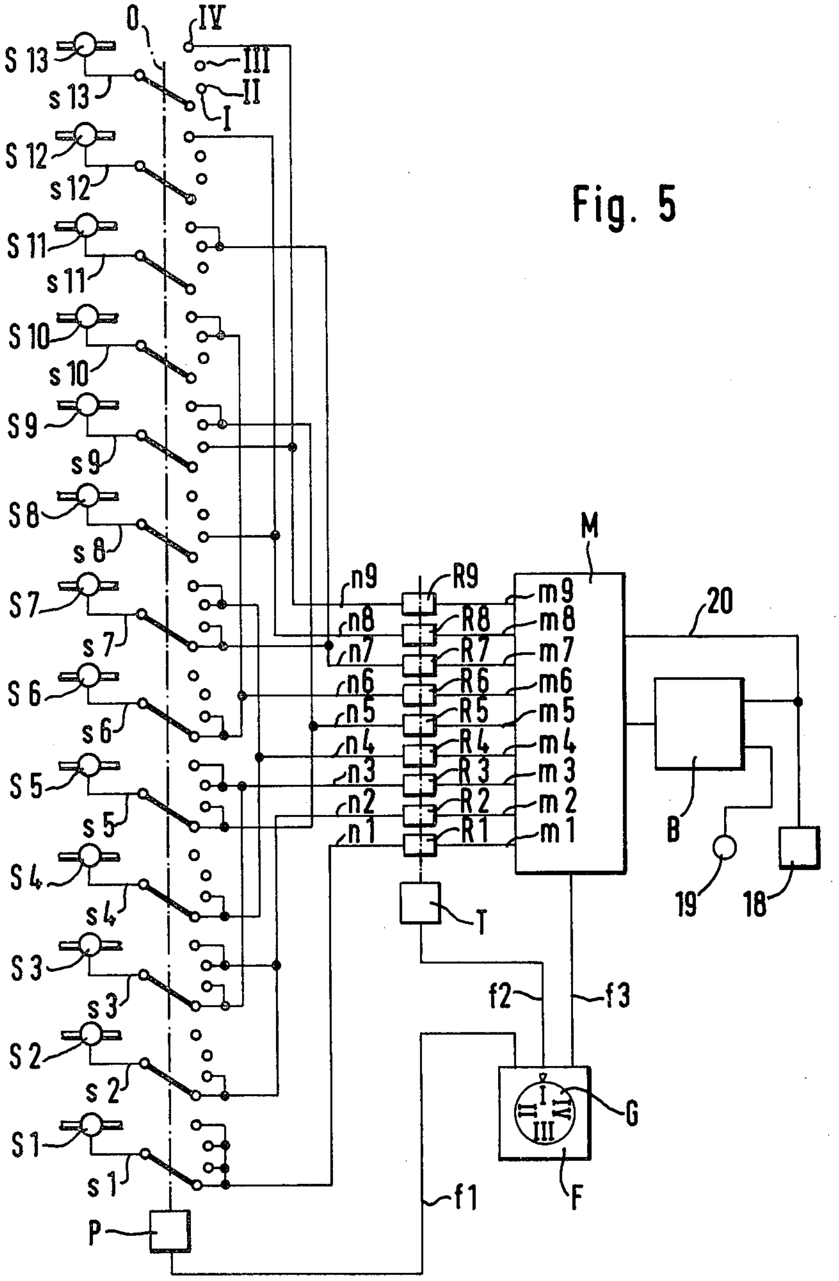
Figure 5A:
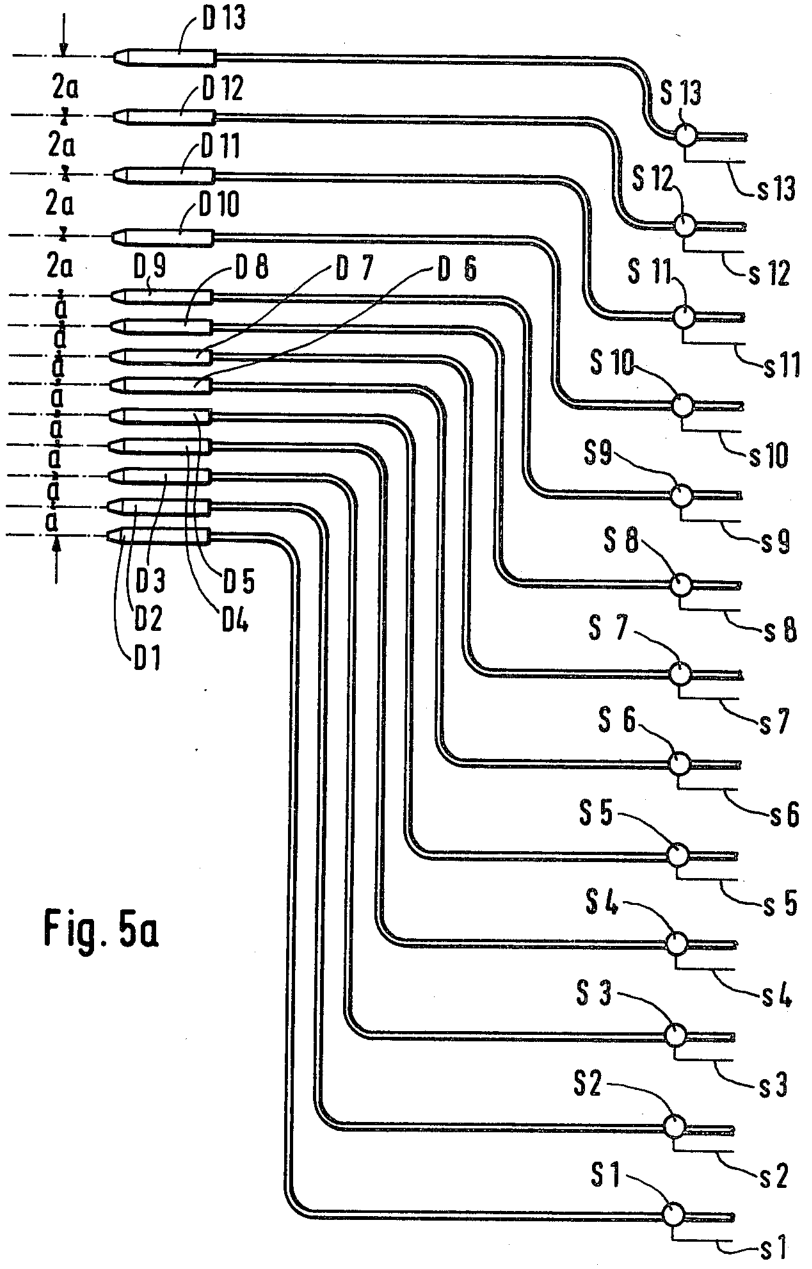

In FIGS. 5 and 5*a*, the thirteen solenoid valves are denoted S1 to S13, and the thirteen nozzles are designated D1 to D13, the valve S1 being connected to the bottom nozzle D1 of the row and the valve S13 being connected to the top nozzle D13 of the row. A pattern generator M is provided with nine output leads m1–m9. The pattern generator can be programmed to provide the required character patterns either according to a seven-lines system (seven-positions system) or according to a nine-lines system. In either case, the scale of the time coordinate of the pattern generator can be set at one or the other of two different values corresponding to different widths (horizontal sizes) of the characters or character combinations produced. The setting of the pattern generator to these various modes of operation is effected by means of switching means provided in the pattern generator and controlled through a cable f3 by a character size selector F provided with a manually operable operating member G, the four positions I to IV of which provide four different modes of operation of the pattern generator, as indicated in Table 1.

| Selector position | Mode of operation of pattern generator |
|---|---|
| I | Seven-lines system, minor character width |
| II | Nine-lines system, minor character width |
| III | Seven-lines system, major character width |
| IV | Nine-lines system, major character width |

Each of the nine output leads m1 to m9 is connected to a switch R1 to R9, respectively, arranged on reception of a control pulse from the output lead m1–m9 to transmit a current pulse to a corresponding control lead n1 to n9, the duration of said current pulse being determined by a timing member T common to all of the switches R1 to R9. The control leads s1 to s13 (which constitute the cable 11 of FIG. 2) of the solenoid valves can be connected to the control leads n1 to n9 by means of a switch O which can be set to any of four positions I–IV by means of an operating member P. The various connections provided by the switch O in the four settings I–IV are indicated in Table 2.

Table 2

| Switch position: | I | II | III | IV |
|---|---|---|---|---|
| n1 connected to: | s1 | s1 | s1 | s1 |
| n2 connected to: | s2 | s2 | s3 | s3 |
| n3 connected to: | s3 | s3 | s5/ s5 | |
| n4 connected to: | s4 | s4 | s7 | s7 |
| n5 connected to: | s5 | s5 | s9 | s9 |
| n6 connected to: | s6 | s6 | s10 | s10 |
| n7 connected to: | s7 | s7 | s11 | s11 |
| n8 connected to: | — | s8 | — | s12 |
| n9 connected to: | — | s9 | — | s13 |

Figure 4:
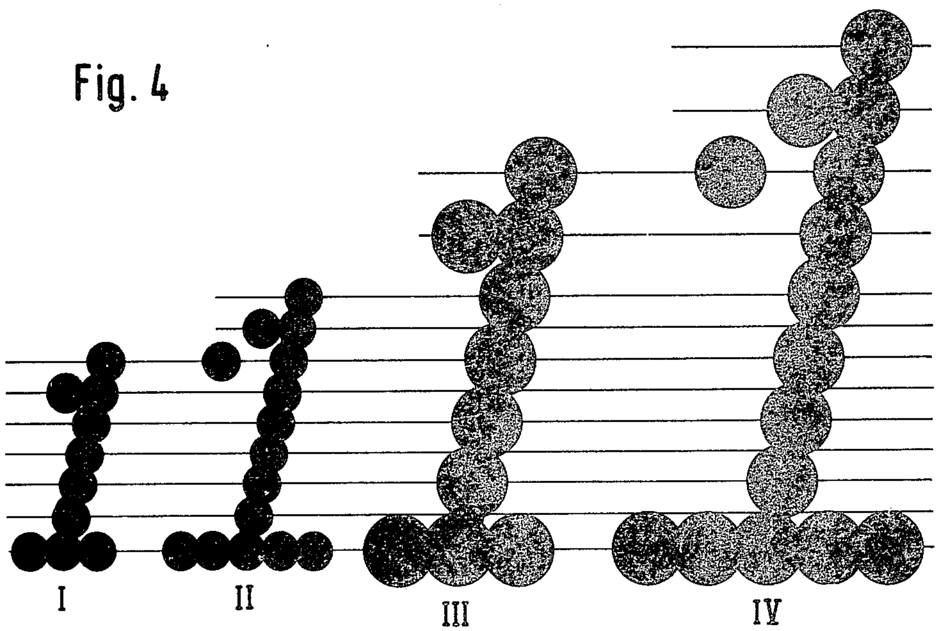

The operating member T of the switch O is connected to the selector F by a control cable f1 and is arranged to be controlled by the selector F in such a way that setting of the selector F to a certain position, for instance the position III, causes the operating member to set the switch O to the corresponding position (III). The vertical point distribution on the package surface resulting from the settings I–IV is shown in FIGS. 3 and 4, in which the four character sizes have been given the corresponding designations I–IV.

The selector F is also connected to the timing member T to control the setting of said member, more particularly in such a way as in selector positions I and II to set the timing member to provide a pulse interval T1, in selector positions III and IV to set the timing member to a pulse interval T2 larger than T1. The pulse interval T1 is adjusted so as to cause the volume of ink allowed to pass by a magnet valve (the admission interval of which corresponds to said pulse interval) and ejected by the nozzle connected thereto to form on the ink receiving surface a spot having a size sufficient to make it touch or overlap a similar spot formed by the ink simultaneously ejected through a second nozzle at a distance a from the first nozzle. In FIGS. 2–4, the characters having the sizes I and II are composed of spots having the size just described. The pulse interval T2 is adjusted so as to make the ejected volume of ink form a spot having a size sufficient to make it touch or overlap a similar spot formed by the ink simultaneously ejected through a second nozzle at a distance 2*a* from the first nozzle. In FIGS. 2–4, the characters having the sizes III and IV are composed of spots having the size just described.

In a specific example of the apparatus according to the invention, the jet nozzles have a bore diameter of 0.25 mm, and the ink is supplied at a pressure of 0.15 atm. above atmospheric pressure. The admission intervals in the two cases above referred to amount to about 1.5 mS and 2.5 mS, respectively. These figures are mentioned by way of example only, as in practice the bore diameter, the ink pressure and the admission intervals may vary considerably with different operating conditions and different sizes of the characters.

The pattern generator M is arranged to be started by a starting impulse provided by a starting unit B. Said unit is arranged to be controlled on one hand by a photocell 19 of the photocell device 16–17, on the other hand by the tachometer generator 18. More particularly, the starting unit is provided with a timing member which is started by a signal from the photocell 19 indicating the arrival of a package to the marking station. The time delay of the timing member is controlled by the tachometer signal. By these means, the marking of the package is caused to begin at a predetermined distance from the leading edge of the package. Preferably means are provided to allow said distance to be adjusted as desired.

The output signal of the tachometer 18 is also supplied directly to an input lead 20 of the pattern generator M connected to means for controlling the speed of operation of the pattern generator, that is, the frequency at which selected signal combinations succeed each other on the output leads m1–m9 of the pattern generator. This feature ensures that the width of, as well as the spacing between, the characters applied to the packages will be independent of occasional variations of speed of the conveyor belt.

We claim:

1. In ink jet printing apparatus comprising a plurality of ink jet nozzles, means for supporting said nozzles in a row in which the axes of the nozzles define a common plane, a solenoid valve for controlling the supply of pressurized ink to each of said nozzles, a control circuit for each of said solenoid valves, and a pattern generator having a plurality of output leads connected to said control circuits, said pattern generator being arranged successively to select predetermined output leads or combinations of output leads and to cause an operating pulse to be transmitted through said selected output leads and control circuits to the respective solenoid valves controlled thereby, the improvement comprising electric switch means arranged in a first position to connect each of said output leads to a respective one of the control circuits of a first group of said solenoid valves controlling the ink supply to a first group of nozzles in said row arranged at a uniform pitch, and in a second position to connect each of said output leads to a respective one of the control circuits of a second group of solenoid valves controlling the ink supply to a second group of nozzles in said row arranged at a pitch equal to twice the pitch of said first group of nozzles and including nozzles within said first group as well as nozzles outside of said first group.

2. Apparatus as claimed in claim 1 which comprises means for adjusting the admission interval of the solenoid valves, said means being common to all of the solenoid valves.

3. Apparatus as claimed in claim 2 which comprises a common operating means for said switch means and said adjusting means, so that a shifting of the switch means into said second position will automatically cause the adjustment means to set a longer admission interval, and shifting of the switch means into said first position will automatically cause the adjustment means to set a shorter admission interval.

4. Apparatus as claimed in claim 1 in which the pattern generator is provided with means for adjusting the time interval between the transmission of successive combinations of control signals.

5. Apparatus as claimed in claim 4 which includes a common operating means for said switch means and said time interval adjusting means, so that shifting of said switch means to said second position will automatically cause the setting of a longer time interval between successive control signal transmissions, and shifting of said switch means to said first position will automatically cause the setting of a shorter time interval between successive control signal transmissions.

* * * * *